US010708151B2

(12) United States Patent
Dixon et al.

(10) Patent No.: US 10,708,151 B2
(45) Date of Patent: Jul. 7, 2020

(54) SYSTEM AND METHODS FOR ADAPTIVE NOTIFICATION AND TICKETING

(71) Applicant: Level 3 Communications, LLC, Broomfield, CO (US)

(72) Inventors: Allen E. Dixon, Arvada, CO (US); Sharna Aeckerle, Denver, CO (US); Paul Farnsworth, Niwot, CO (US); Rene Grippo, Boulder, CO (US); Eric D. Gundersen, Broomfield, CO (US); Sanjiv Kumar, Erie, CO (US); Rick D. Lind, Longmont, CO (US); Matthew R. Moore, Arvada, CO (US); Luke P. Philips, Denver, CO (US); Rajiv K. Singh, Thornton, CO (US); Raymond L. Smith, Lafayette, CO (US); David L. Stozki, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 344 days.

(21) Appl. No.: 15/332,887

(22) Filed: Oct. 24, 2016

(65) Prior Publication Data
US 2017/0118092 A1 Apr. 27, 2017

Related U.S. Application Data

(60) Provisional application No. 62/245,140, filed on Oct. 22, 2015.

(51) Int. Cl.
H04L 12/26 (2006.01)
H04L 12/24 (2006.01)

(52) U.S. Cl.
CPC ............ *H04L 43/04* (2013.01); *H04L 41/069* (2013.01); *H04L 41/0631* (2013.01);
(Continued)

(58) Field of Classification Search
CPC ....... G06N 5/00–048; G06N 7/00–005; G06N 99/005; H04N 41/06–0695; H04N 41/14–16; H04N 41/04–0896
See application file for complete search history.

(56) References Cited

U.S. PATENT DOCUMENTS 6,054,995 A * 4/2000 Allen ...................... G06T 13/20
345/619
6,972,761 B1 * 12/2005 Cox ....................... G06T 11/206
345/440

(Continued)

*Primary Examiner* — David R Lazaro
*Assistant Examiner* — Julian Chang

(57) ABSTRACT

Aspects of the present disclosure include an adaptive notification and ticketing system for a telecommunications network. The system includes a computing device and a plurality of network devices associated with the telecommunications network. Data is generated about a plurality of past network events associated with the plurality of network devices. The computing device is utilized to generate a model from the data. The model may be used to interpret new network events and generate an output indicative of a service impact event. The new network events are applied to the model using the computing device to generate the output indicative of a service impact event. The computing device generates a responsive action from the output indicative of a service impact event. The service impact event is a network event that disrupts a network service associated with the telecommunications network.

20 Claims, 11 Drawing Sheets

(52) U.S. Cl.
CPC ...... *H04L 41/0654* (2013.01); *H04L 41/0681* (2013.01); *H04L 41/0893* (2013.01); *H04L 41/142* (2013.01); *H04L 41/147* (2013.01); *H04L 43/045* (2013.01)

(56) References Cited

U.S. PATENT DOCUMENTS

| | | | | |
|---|---|---|---|---|
| 7,337,222 | B1* | 2/2008 | Du | H04L 12/28 709/223 |
| 8,370,462 | B2* | 2/2013 | Pelletier | H04L 41/0604 709/220 |
| 8,811,177 | B1* | 8/2014 | Toudeh-Fallah | H04L 41/5019 370/235 |
| 8,890,676 | B1* | 11/2014 | Heath | G08B 29/188 340/3.1 |
| 9,306,962 | B1* | 4/2016 | Pinto | H04L 63/1416 |
| 9,465,778 | B1* | 10/2016 | DeBo | G06Q 10/063 |
| 9,519,477 | B2* | 12/2016 | Champlin-Scharff | G06F 9/454 |
| 9,760,529 | B1* | 9/2017 | Ho | G06F 9/4806 |
| 9,922,192 | B1* | 3/2018 | Kashyap | G06F 21/566 |
| 9,924,029 | B2* | 3/2018 | Shaw | H04M 3/42153 |
| 2001/0014143 | A1* | 8/2001 | Kuhn | H04M 3/51 379/67.1 |
| 2001/0044840 | A1* | 11/2001 | Carleton | H04L 41/0663 709/223 |
| 2002/0004390 | A1* | 1/2002 | Cutaia | H04L 41/18 455/424 |
| 2002/0049789 | A1* | 4/2002 | Frolich | G05B 17/02 715/209 |
| 2002/0169982 | A1* | 11/2002 | Brock | G06F 21/55 726/4 |
| 2003/0083786 | A1* | 5/2003 | Pietrowicz | H02J 13/00018 700/286 |
| 2003/0135382 | A1* | 7/2003 | Marejka | G06F 11/0709 709/232 |
| 2003/0139174 | A1* | 7/2003 | Rao | H04L 29/06 455/418 |
| 2003/0140039 | A1* | 7/2003 | Ferguson | G06K 9/00503 |
| 2004/0088386 | A1* | 5/2004 | Aggarwal | G06F 11/3495 709/220 |
| 2004/0088403 | A1* | 5/2004 | Aggarwal | H04L 41/0681 709/224 |
| 2004/0088404 | A1* | 5/2004 | Aggarwal | H04L 41/0681 709/224 |
| 2004/0088405 | A1* | 5/2004 | Aggarwal | H04L 41/069 709/224 |
| 2004/0153698 | A1* | 8/2004 | Guzman | H04L 41/0663 714/4.1 |
| 2004/0172412 | A1* | 9/2004 | Files | H04L 41/5054 |
| 2004/0215765 | A1* | 10/2004 | Asher | H04L 41/0273 709/224 |
| 2005/0261837 | A1* | 11/2005 | Wegerich | G06N 5/025 702/19 |
| 2006/0036560 | A1* | 2/2006 | Fogel | G06N 5/025 706/45 |
| 2006/0069757 | A1* | 3/2006 | Peters | G06Q 10/06 709/220 |
| 2006/0072707 | A1* | 4/2006 | Araujo | H04L 41/06 379/1.01 |
| 2006/0106743 | A1* | 5/2006 | Horvitz | G06N 99/005 706/21 |
| 2006/0111857 | A1* | 5/2006 | Shah | G01D 1/00 702/85 |
| 2007/0097880 | A1* | 5/2007 | Rajsic | H04L 45/04 370/254 |
| 2007/0177523 | A1* | 8/2007 | Nagami | H04L 41/0631 370/252 |
| 2007/0183318 | A1* | 8/2007 | Johnson | H02J 13/0075 370/225 |
| 2007/0211768 | A1* | 9/2007 | Cornwall | G01D 4/004 370/509 |
| 2007/0226325 | A1* | 9/2007 | Bawa | H04L 41/5012 709/223 |
| 2008/0080497 | A1* | 4/2008 | Meijer | G06F 17/303 370/389 |
| 2008/0080526 | A1* | 4/2008 | Gounares | H04L 41/147 370/401 |
| 2008/0216055 | A1* | 9/2008 | Khatutsky | G06F 11/3409 717/127 |
| 2008/0294672 | A1* | 11/2008 | Dieberger | G06F 17/30958 |
| 2009/0080343 | A1* | 3/2009 | Simmons | H04L 69/40 370/254 |
| 2009/0113049 | A1* | 4/2009 | Nasle | G05B 13/026 709/224 |
| 2009/0157573 | A1* | 6/2009 | Anderson | G06N 99/005 706/12 |
| 2009/0168645 | A1* | 7/2009 | Tester | H04L 41/0677 370/225 |
| 2009/0281673 | A1* | 11/2009 | Taft | G01D 4/002 700/286 |
| 2010/0042570 | A1* | 2/2010 | Mayers | H04L 12/58 706/46 |
| 2010/0318836 | A1* | 12/2010 | Ness | G06F 11/0709 714/4.1 |
| 2011/0071963 | A1* | 3/2011 | Piovesan | G06Q 10/00 706/11 |
| 2011/0173146 | A1* | 7/2011 | Hnatio | G06Q 10/06 706/14 |
| 2011/0288692 | A1* | 11/2011 | Scott | G06F 21/55 700/297 |
| 2012/0040662 | A1* | 2/2012 | Rahman | H04W 36/0055 455/423 |
| 2013/0103823 | A1* | 4/2013 | DeJana | G06Q 10/04 709/224 |
| 2013/0305102 | A1* | 11/2013 | Malnati | G06F 11/3055 714/49 |
| 2014/0019996 | A1* | 1/2014 | Shaw | H04W 4/90 719/318 |
| 2014/0101308 | A1* | 4/2014 | Wanser | H04L 43/08 709/224 |
| 2014/0115071 | A1* | 4/2014 | Echeverria | G06Q 10/107 709/206 |
| 2014/0164585 | A1* | 6/2014 | Shaw | H04L 41/5025 709/223 |
| 2014/0236705 | A1* | 8/2014 | Shao | G06Q 30/0242 705/14.41 |
| 2014/0270136 | A1* | 9/2014 | Thomson | H04M 3/51 379/265.03 |
| 2014/0279745 | A1* | 9/2014 | Esponda | G06N 5/043 706/12 |
| 2014/0300757 | A1* | 10/2014 | Dhaliwal | H04N 17/004 348/192 |
| 2015/0088787 | A1* | 3/2015 | Janson | G06F 19/707 706/11 |
| 2015/0135012 | A1* | 5/2015 | Bhalla | H04L 41/147 714/26 |
| 2015/0355957 | A1* | 12/2015 | Steiner | G06F 11/0772 714/37 |
| 2015/0379520 | A1* | 12/2015 | Allen | G06Q 30/016 705/304 |
| 2016/0062816 | A1* | 3/2016 | Ivanova | G06F 11/0772 726/26 |
| 2016/0063502 | A1* | 3/2016 | Adjaoute | G06Q 20/4016 705/44 |
| 2016/0146709 | A1* | 5/2016 | Dey | G07C 3/00 702/183 |
| 2016/0239756 | A1* | 8/2016 | Aggour | G05B 23/0229 |
| 2016/0277952 | A1* | 9/2016 | Hui | H04W 24/08 |
| 2016/0350194 | A1* | 12/2016 | Mohan | G05B 23/0254 |
| 2017/0006135 | A1* | 1/2017 | Siebel | H04L 67/02 |
| 2017/0048109 | A1* | 2/2017 | Kant | H04L 41/5025 |
| 2017/0063599 | A1* | 3/2017 | Wu | H04L 41/064 |
| 2017/0076092 | A1* | 3/2017 | Kashyap | G06F 21/316 |
| 2017/0091867 | A1* | 3/2017 | Trainor | G06Q 40/08 |
| 2017/0091868 | A1* | 3/2017 | Trainor | G06N 5/04 |
| 2017/0091869 | A1* | 3/2017 | Trainor | G06N 5/04 |
| 2017/0091870 | A1* | 3/2017 | Trainor | G08B 13/08 |

(56) References Cited

U.S. PATENT DOCUMENTS

| | | | |
|---|---|---|---|
| 2017/0091871 A1* | 3/2017 | Trainor | G06Q 40/08 |
| 2017/0092108 A1* | 3/2017 | Trainor | G08B 23/00 |
| 2017/0094376 A1* | 3/2017 | Trainor | H04Q 9/00 |
| 2017/0111391 A1* | 4/2017 | Chao | H04L 63/1491 |
| 2017/0124483 A1* | 5/2017 | Huang | G06N 99/005 |
| 2017/0264509 A1* | 9/2017 | Wanser | H04L 41/085 |
| 2018/0107583 A1* | 4/2018 | Champlin-Scharff | G06F 9/454 |
| 2019/0180172 A1* | 6/2019 | Baughman | G06N 3/0472 |

* cited by examiner

SYSTEM AND METHODS FOR ADAPTIVE NOTIFICATION AND TICKETING

CROSS-REFERENCE TO RELATED APPLICATION

This Patent Application is related to and claims priority under 35 U.S.C. § 119(e) to U.S. Provisional Patent Application No. 62/245,140 entitled "ADAPTIVE NOTIFICATION AND TICKETING SYSTEM", filed Oct. 22, 2015, the entire contents of which is herein incorporated by reference in its entirety.

TECHNICAL FIELD

Aspects of the present disclosure relate to an adaptive notification and ticketing system for a network; and more particularly, to a system that generates models including rules, functions or algorithms derived from analysis of data associated with network events (such as alerts, feedback, traffic, and tickets) to correlate network events, determine service impacting events from the network events, and adjust notifications regarding the network events.

BACKGROUND

A service provider in the telecommunications industry faces unique challenges with respect to deploying, monitoring, and maintaining technical infrastructure needed to provide telecommunications services to customers. For example, hundreds of devices may be deployed and interconnected throughout a large geographic region in order to provide voice or data services, and any number of possible alerts, often referred to as "events," may occur that affect or relate to those devices. The service provider must identify and respond to certain events in a timely manner. There are systems where the occurrence of an event causes the generation of a ticket, and then actions are taken to correct whatever problem exists and close the ticket.

Conventional ticketing and service systems, however, have various drawbacks. For example, conventional systems may generate multiple tickets when one event causes other events and tickets are generated for each event. With conventional systems, a great amount of human effort is required to process information, false alarms may be generated, and effective reporting may be lacking. Customers may even discover problems before the problem is recognized in the system.

It is with these observations in mind, among others, that various aspects of the present disclosure were conceived and developed.

SUMMARY

A need exists for a system that can predict or identify service impact events from other events in a telecommunications network and also provide adaptive notification regarding such service impact events. Accordingly, one implementation of the present disclosure may take the form of a method for adaptive notification and ticketing, comprising: utilizing a computing device comprising a memory for storing instructions that are executed by a processor to perform operations of: accessing data associated with a plurality of past events from a plurality of network elements of a telecommunications network; generating a model from the data, the model configured to receive a plurality of new events and generate an output indicative of a service impact event; applying the plurality of new events to the model to generate the output indicative of the service impact event; and from the output indicative of the service impact event, generating a responsive action.

Another implementation of the present disclosure may take the form of an adaptive notification and ticketing apparatus, comprising: a network element of a telecommunications network that generates past network event data, the past network event data associated with a past network event; and a computing device with access to the past network event data, the computing device generating a rule from the past network event data and applying a new network event to the rule to identify a service impact event.

Another implementation of the present disclosure may take the form of a method for adaptive notification and ticketing, comprising: utilizing machine learning to train a computing device, by: providing a training data set to the computing device, the training set comprising a series of network events, at least a portion of the training data set comprising certain network events associated with known classes defining one or more service impacting events; generating a classification function based on results of the providing of the training data set to the computing device to predict future service impacting events; and applying the classification function to a new network event to identify a class associated with the new network event. The class indicates whether the new network event is associated with a service impact event.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1A:
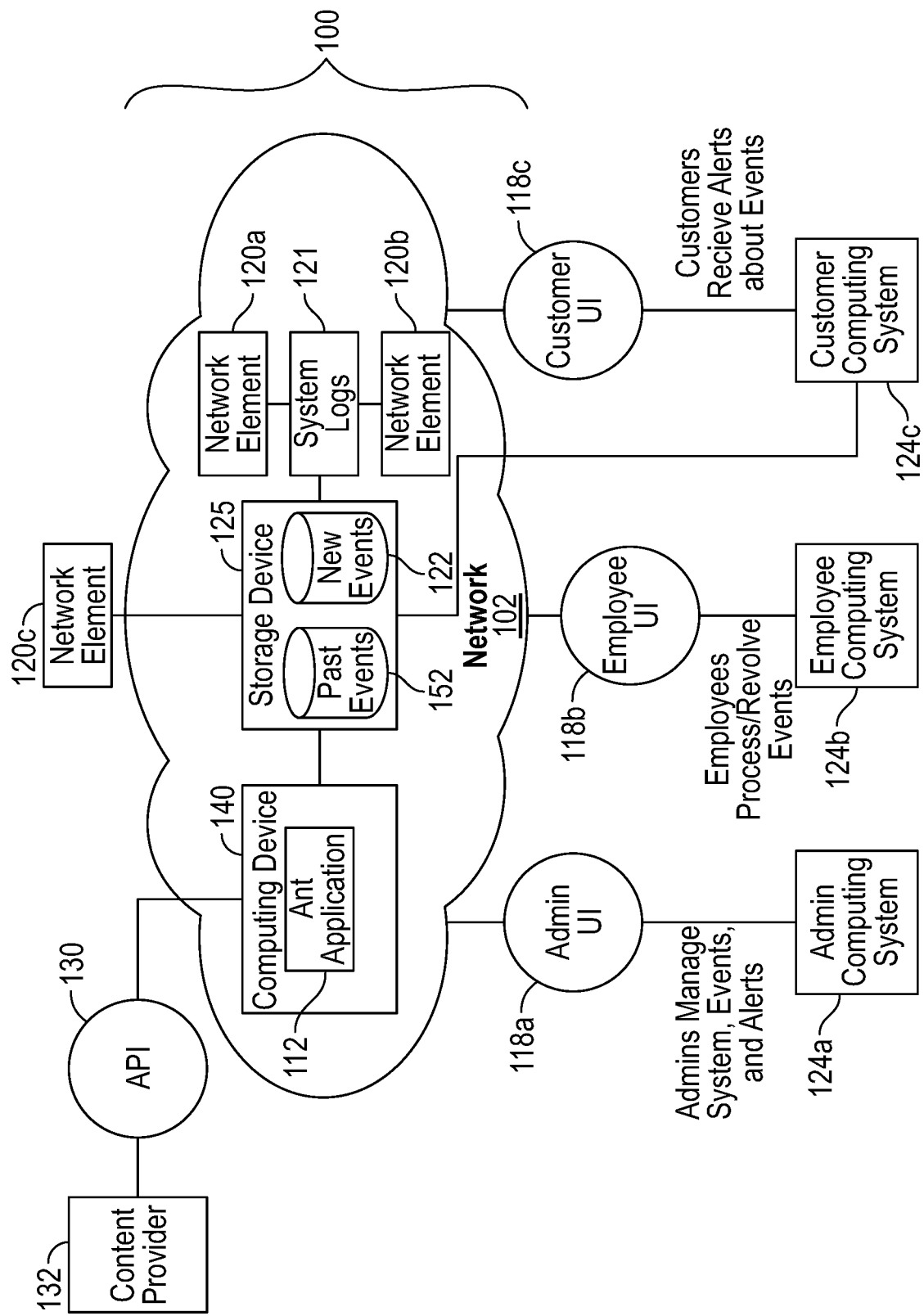
FIG. 1A is an exemplary system view of an adaptive notification and ticketing (ANT) system, according to aspects of the present disclosure.

Aspects of the present disclosure involve a computing system and methods, implemented by the computing system, for adaptive notification and ticketing (ANT) in a telecommunications network. The ANT method involves accessing a wide variety of event data or data associated with events (including alerts, utilization traffic, tickets, and the like). The ANT system then generates models, including rules and functions, from the event data. In one example, the ANT system includes a machine learning, complex event processing, or similar computational method or combinations thereof, to which the event data is fed to generate a model. Once the model is generated, new event data may be fed into the model and used to predict significant events or service impact events that would cause a service outage, among other features. For example, relatively minor "child" events may feed into the model, and predict a relatively more important parent event or service impacting event. The ANT system may further adjust notifications and ticketing for customer devices affected by the service impacting event. A customer device or service may be identified as being affected by the service impact event where the customer device accesses a device or service associated with the service impact event. For example, where the service impact event involves a router failure, a customer device affected by that service impact event may be a device that accesses that router to receive a telecommunications service. Notifications may be transmitted to customers to alert the customers regarding any customer network devices affected by the service impact event and notification preferences may be adjusted based on feedback regarding such notifications. Further, where the service impact event caused a plurality of tickets to be generated from child events associated with the service impact event, such tickets may be closed so that network technicians (and customers) can focus on the service impact event which reduces time addressing child events to instead focus on the service impact event.

The ANT system and method may utilize complex event processing by implementing a complex event processor to generate and apply the model as disclosed herein. Complex event processing may involve tracking and analyzing (processing) numerous data streams associated with network events that take place (or have already taken place) in the telecommunications network as described herein, and identifying patterns or relationships between such events to generate one or more rules. For example, a pattern may be identified that a particular sequence of events is typically indicative of a fiber cut, which is considered a service impact event because any customer accessing Internet, voice or other services over that fiber would have those services possibly unavailable until the fiber is replaced. When fiber is cut, such as from the fiber being run over in a data center, accidently dug up during construction, or any number of the other things, a cascade of network errors may flow from the event. In this example, the known sequence of events may be used to generate a rule that would recognize the same or a similar sequence of events, and identify a new fiber cut when that sequence is recognized using the rule.

The ANT system may further employ machine learning methods with a computing device to enhance, supplement, or compliment any rules derived from the complex event processing. Machine learning methods may include unsupervised machine learning such as clustering. With clustering machine learning methods, the ANT system may generate a model using a computing device that deduces attributes or structures present in network event data to group network events based on similarities between such attributes. Machine learning methods may further include supervised or semi-supervised methods such as classification. With classification machine learning methods, the ANT system may present the computing device with training data to generate a function. The training data comprises past network event data and patterns, or known correlations between past events (such as any patterns or rules derived from complex event processing identifying certain events as being indicative of service impact events). The function is a computer-generated representation of any rule or pattern provided by the training data and attributes of new network data may be fed to the function to output a class, which may define a service impact event, as described herein. So, for example, returning to the example of a fiber cut, machine learning may be used to learn other events, not present in the known sequence, that are also indicative of a fiber cut.

Figure 1B:
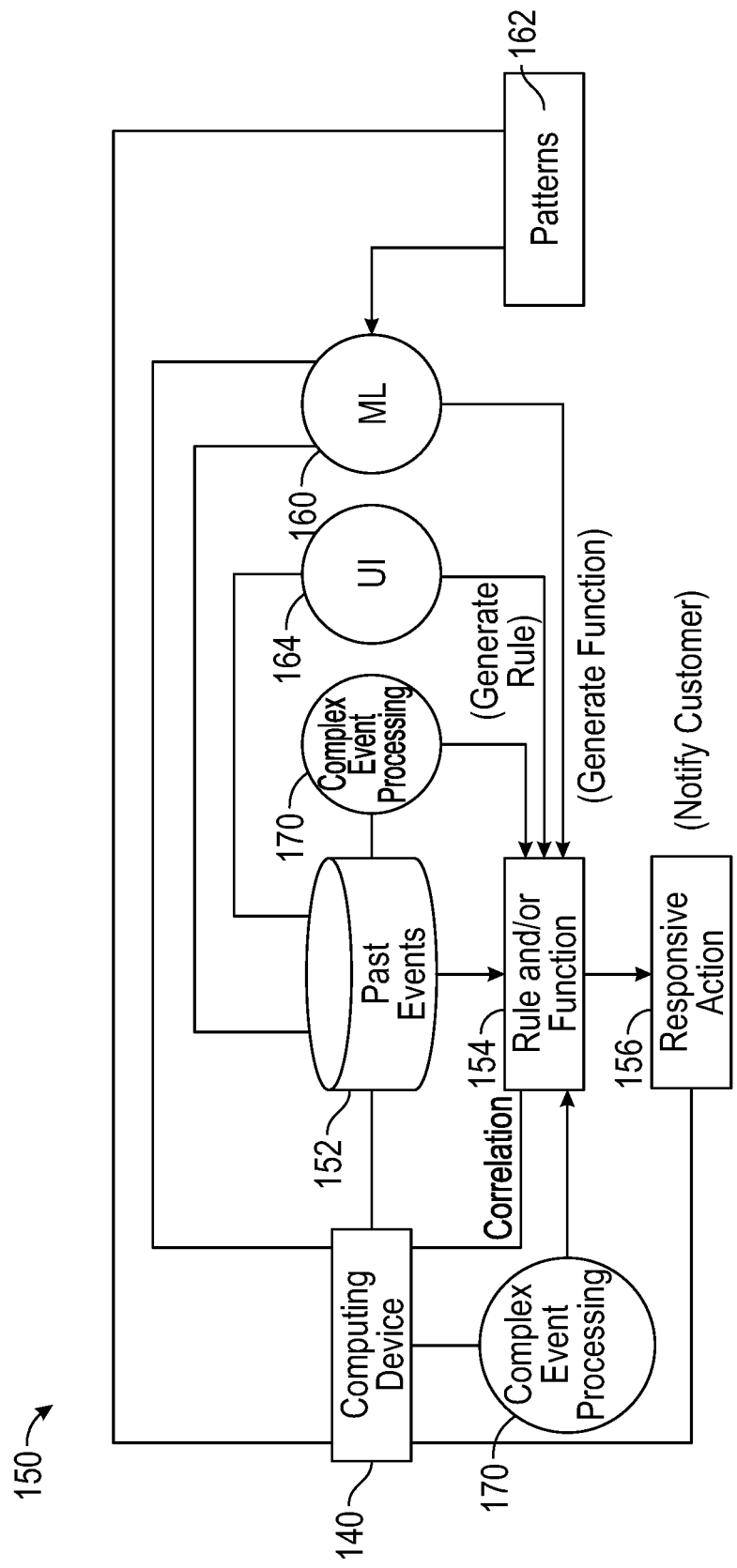
FIG. 1B is a diagram depicting the generation of rules or functions from network event data, according to aspects of the present disclosure.
Figure 2:
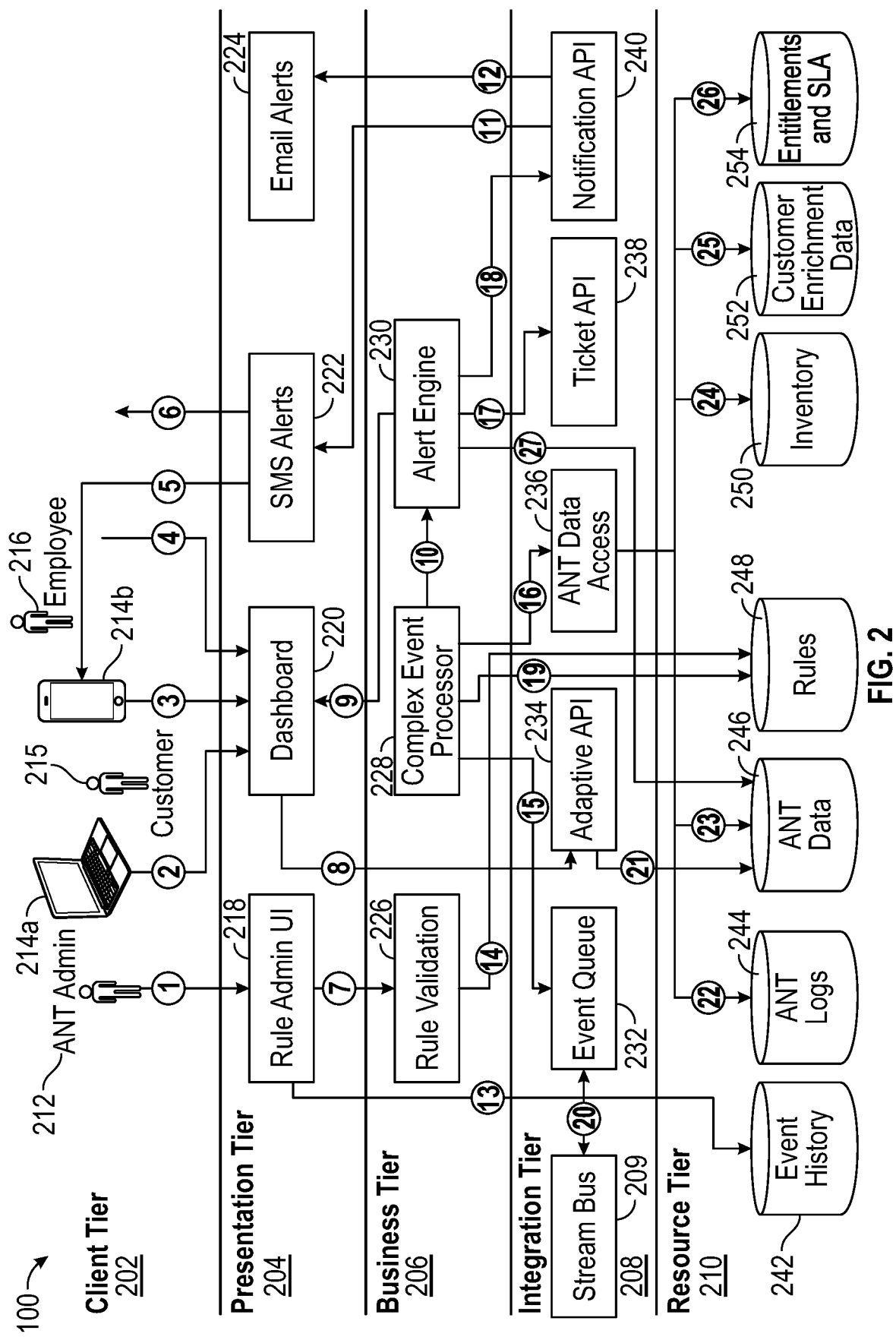
FIG. 2 is a second exemplary system view of an ANT system, showing a flow of information and relationships between various exemplary components of an ANT system. Sequences 1-27 of FIG. 2 show possible relationships and interactions between the exemplary components of the ANT system, according to aspects of the present disclosure.
Figure 3:
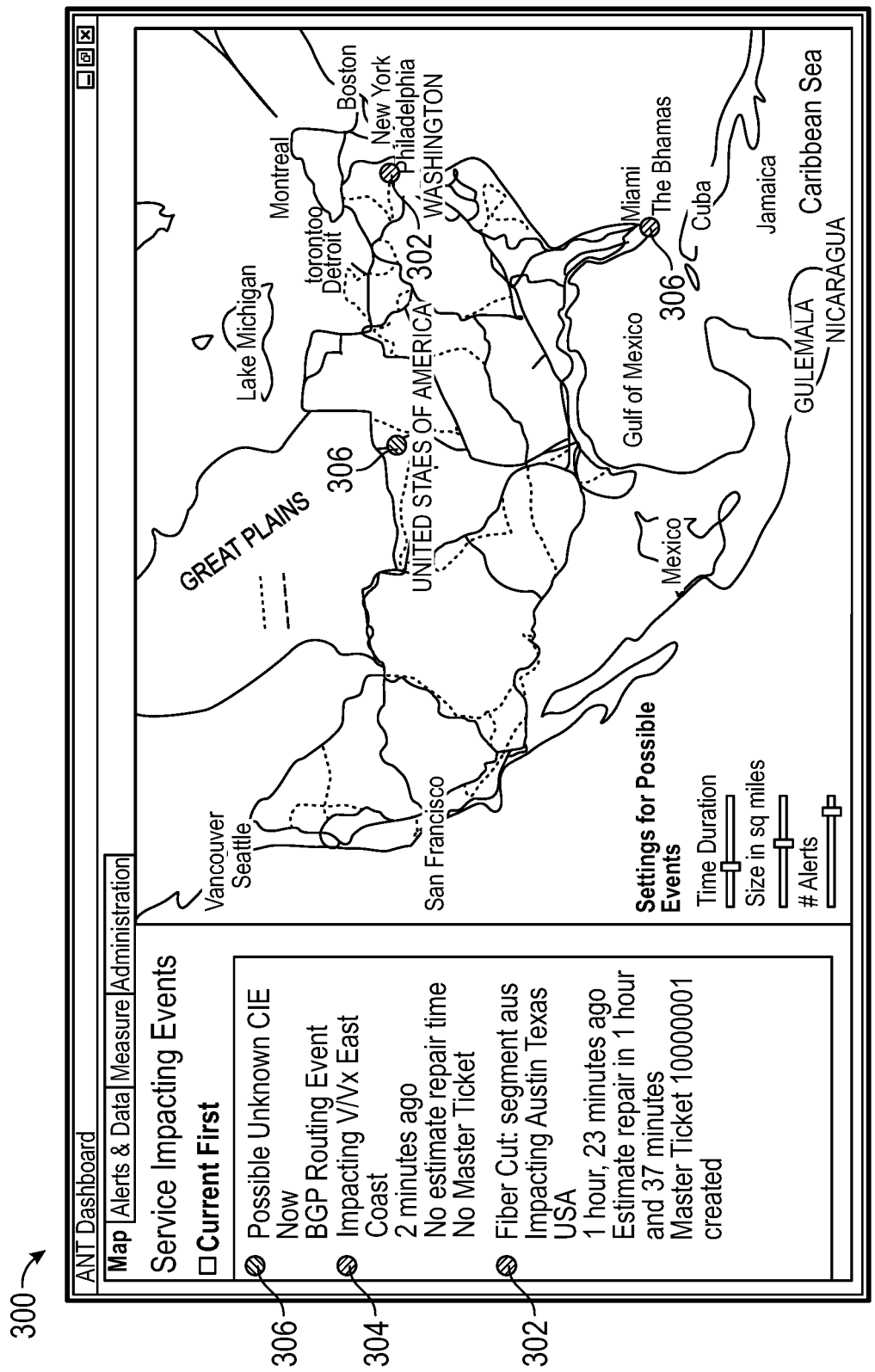
FIG. 3 is an exemplary dashboard of an ANT application showing a map tab or map interface, according to aspects of the present disclosure.
Figure 8:
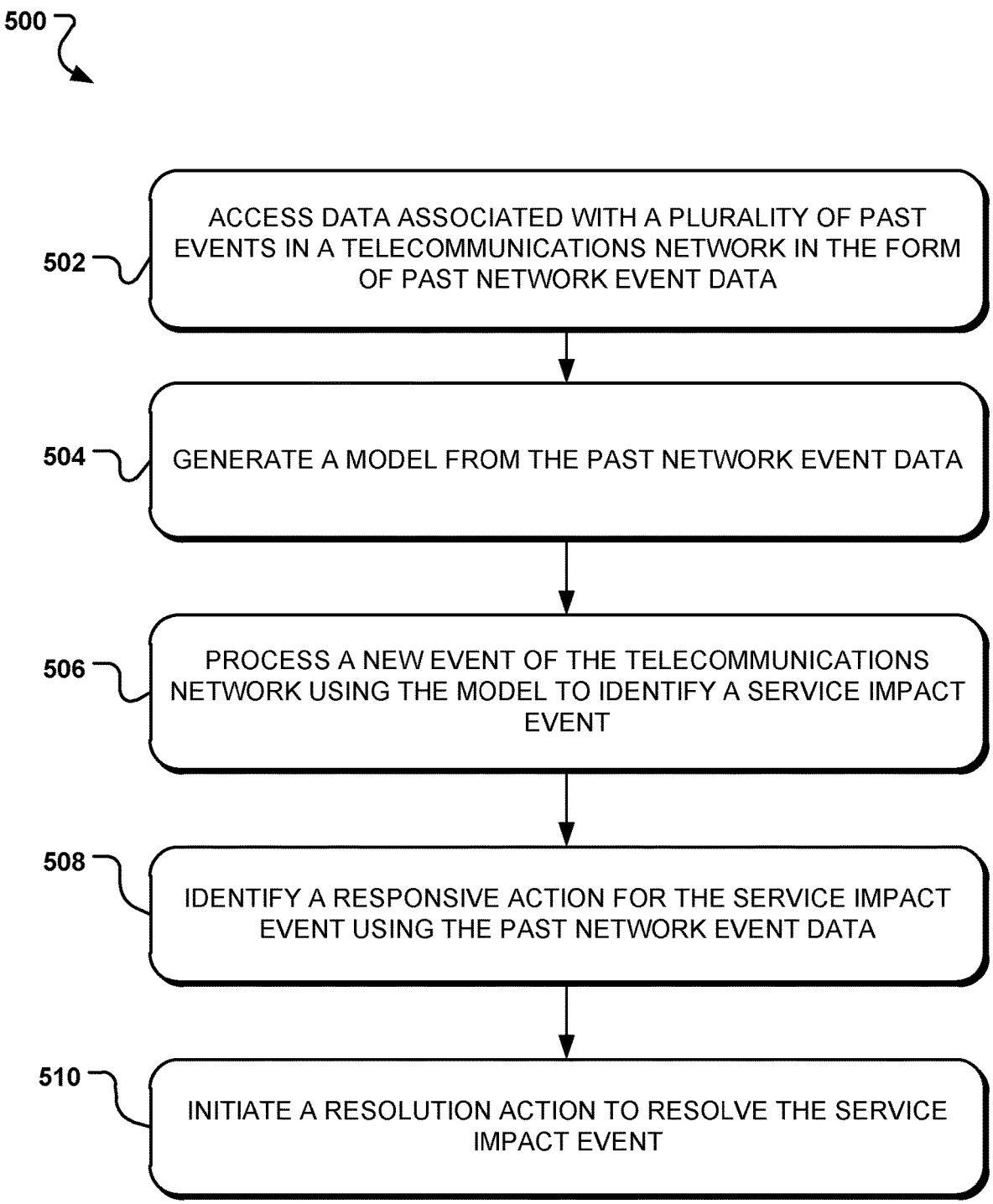
FIG. 8 illustrates an exemplary process flow for generating a model to analyze network event data with reference to the ANT system of FIGS. 1A-1B and FIG. 2, according to aspects of the present disclosure.

Generation of a model and implementation of the model to identify a service impact event may be described by the exemplary process flow 500 shown in FIG. 8 with reference to an ANT system 100 described in FIGS. 1A-1B and FIG. 2. As described in block 502 of FIG. 8, past network event data, or data associated with a plurality of past events in a telecommunications network, such as a network 102, may be accessed by a computing device 140. The computing device 140 of FIG. 1A may be a server, a desktop, or other suitable computing device. The computing device 140 includes at least one processor for executing an ANT application 112 which provides functionality for accessing the network event data in addition to other functions such as defining rules or implementing machine learning using the computing device 140, managing network events, providing information to certain devices, and displaying alerts to computing systems of the ANT system 100 as described herein. The network 102 may comprise a telecommunications network managed by a service provider and may include virtual private networks, local area networks, wide area networks, Wi-Fi networks, cellular networks, Internet Protocol (IP) networks, voice and voice over IP (VoIP) networks or any combination thereof. The network 102 may comprise a plurality of sub-networks, or customer networks, or the network 102 may otherwise have access to the same. The network 102 may further comprise a plurality of interconnected or linked network devices such as switches, routers, and associated computing resources that are used to provide or access telecommunications services. In the example of FIG. 1A, such devices may include a network element 120A, a network element 120B, a network element 120C (for providing telecommunication services), and computing systems 124 (for accessing and administering the telecommunications services).

The computing device 140 may access the past network event data from a past events database 152 (FIGS. 1A-1B) or event history database 242 (FIG. 2). Past network event data from the past events database 152, may include messages, system logs, alerts, tickets, or the like and associated with past network events such as errors, outages, failures, and other such events that have transpired within or otherwise involved the network 102. For example, a past network event may involve a device failure which may be associated with past network event data in the form of an error message or system log that the device (or a different network element) generated to memorialize the device failure. It should be understood that an event as described herein may also include activity associated with the network 102 that is not necessarily negative or reflective of a network issue. For example, an event may also include a survey response submitted by a customer who the customer uses to indicate how frequently the customer desires to receive notifications regarding changes or service impact events concerning the network 102.

In the example of FIG. 1A, the past network event data of the past events database 152 is generated by the network element 120A, network element 120B, the network element 120C, and the computer systems 124. The past events database 152 may be maintained within a storage device 125 or any computing device having sufficient memory and computing resources to store and retrieve such past event data for the computing device 140 as needed. As further shown, a system log server 121 may be implemented to aggregate network event data from one or more of the network elements associated with the network 102 (such as the network element 120A and network element 120b). In many cases, event data from some form of network element may be of different forms and include different information; the log server or other component of the ANT system may normalize event data into a common form or format useful for the system to process. The past events database 152 is not limited to a single database and may comprise a plurality of databases stored across one or more storage devices. The information within the database 152 may be considered "big data" and may comprise large data sets that may be analyzed computationally by the computing device 140 to reveal patterns, trends, and associations as described herein. In other words, the past network event data of the past events database 152 can be used to build and test rules, functions, or other models.

As explained in block 504 of FIG. 8, a model 154 which may include a function, rule, algorithm, or the like (or combinations thereof) may be generated using the past network event data of the past events database 152. The model may be generated using complex event processing, machine learning, human input, or combinations thereof as described herein. FIG. 1B illustrates exemplary model generation using the past network event data from the past event database 152. As shown, the ANT system 100 may generate the model 154 taking into account input from complex event processing 170. The ANT system 100 may further utilize input from machine learning (ML) 160 to generate (or supplement) the model 154 which may involve patterns 162 derived or known from the past network event data of the past event database 152.

Complex event processing 170 may involve tracking and analyzing (processing) data streams associated with network events that occur in the network 102 to identify patterns or relationships between such events, and generating a rule based on the stream of events. The rule is intended to generate an output that identifies one or more possible parent events or service impact events when a similar pattern or set of events is applied to the rule, where the events represent inputs into the rule. Complex event processing 170 may be used to generate rules as a subset for the model 154 and also to apply the model 154 to new network event data. The CEP 228 may be a dedicated processor implemented by the computing device 140 or other device with hardware suitable for processing voluminous amounts of data, such as a quad core processor with 4 GB of RAM, or the like. To generate a rule, the CEP 228 may pinpoint the most significant events or service impact events, and identify trigger actions or network events that typically lead to a service impact event. The output of a rule may be an alert of an impending or existing service impacting event. In such an example, the CEP 228 receives an event stream, which may be a sequence of events, that when processed by a rule, provides the alert.

The CEP 228 may utilize any number of complex event processing methods. For example, the CEP 228 may conduct event aggregation to group multiple events into an underlying data event (such as a service impacting event) that are similar in nature but not necessarily identical. Grouping in this manner may be achieved using various analytics methods. For example, statistical summaries of network events may identify service impacting events and the devices that are affected by those events. Temporal aggregation may further be utilized to identify when the same problem is reported repeatedly by a service impacting event. The CEP 228 may further employ root cause analysis to analyze dependencies between various network events to detect where some events can be explained by other events. For example, using the computing device 140, and analyzing past network event data, the CEP 228 may be used to determine that a particular sequence of events, in an event stream, is typically an indicator of a service impact event associated with a network device failure. As such, the ANT administrator 212 may generate a rule that defines new network data, or new network data event streams, having the same or similar sequence of events, as being an indicative of the same or similar network device failure. As another example, the CEP 228 may be used to scan through past network event data of the event history database 242 to identify a time period reflecting spikes in frequency of network events (which may indicate that a service impact event occurred during that time period). In some embodiments, the CEP 228 or related features may be accessed remotely from a content provider 132 via an API 130 as shown in FIG. 1A.

FIG. 2 further shows the CEP 228 may scan data and events in an event queue 232 and can be used to identify rules for service impacting events.

In some embodiments, the model 154, which may be stored in the rules database 248, may be edited or accessed by way of a user interface (UI) 164, which may be similar to the user interfaces 118 of FIG. 1A. For example, a technician or a group of technicians may determine that the model 154 needs to be edited to reflect a newly discovered root cause of a certain past service impact event. The UI 164 may be utilized to access and modify the model 154 stored in the rules database 248 so that the model 154 upon being modified may be used to monitor events for the root cause (so that the model 154 as modified can predict other future service impact events that show similar signs of the root cause). The UI 164 may further allow an administrator to delete rules of the model 154 or otherwise conduct other management functions with respect to the model 154 as necessary. Sequences 1, 7, 13, and 14 of FIG. 2 are associated with the features of viewing, deleting and creating such rules for the model 154 of the ANT system 100. Sequence 1 shows an ANT administrator 212, accessing a rule administration user interface (UI) 218 which may be similar to an admin UI 118a of FIG. 1A or the UI 164 of FIG. 1B. The rule administration UI 218 may be accessed by way of a computing device such as an admin computing system 124a. The ANT administrator 212 may access the rule administration UI 218 to view, delete, create, or update rules or functions about the network event data described herein. Sequence 13 shows that the rule administration UI 218 may be utilized to access past network event data from an event history database 242 so that the past network event data can be filtered and displayed to determine if a correlation or pattern exists between events and whether events are associated with a service impact event. For example, it may be desired to access information about a past service impact event that occurred during a predefined time period, in order to identify child events, or other events associated with the service impact event that also occurred during the same predefined time period or shortly thereafter. The rule administration UI 218 may be used to filter the past network event data of the event history database 242 to view network events within or close to the predefined time period. Sequences 7 and 14 of FIG. 2 indicate that once a rule for the model 154 has been created, the rules syntax may be verified and tested against data of the event history data 242. A rule may then be stored in a database as part of the model 154, such as the rules database 248, to be used by the CEP 228 as described herein.

The model 154 generated in block 504 of FIG. 8 may be supplemented or entirely generated using machine learning. The ANT system 100 may utilize machine learning 160 as shown in FIG. 1B, implemented using the computing device 140 and the ANT application 112. The machine learning 160 may in some embodiments make use of patterns 162 associated with the event data 152 identified during complex event processing 170. Machine learning 160 may encompass any computer science methodologies to train, or teach the computing device 140 to learn without being explicitly programmed to arrive at a particular output. With machine learning 160, the computing device 140 (or other device) may be trained with or learns from network event data, likely but not limited to event data that has occurred in the past (historical event data). Machine learning 160 may generate functions or additional rules for the model 154 that can be used to process or otherwise analyze network event data. In particular, machine learning 160 may enhance or lend greater precision to the model 154 because the machine learning 160 may be used to break down network event data associated with events into data features or attributes, and identify relationships between events based on the event data attributes as discussed herein. In addition, the machine learning 160 may modify any machine-learning generated rules or functions over time to improve accuracy as discussed herein.

Machine learning 160 may include unsupervised machine learning such as clustering. With clustering machine learning methods, the computing device 140 of the ANT system 100 may be used to generate a set of rules that deduces attributes or structures present in past network event datasets, and groups network events based on similarities between such attributes or distances. Similarities are a set of rules that serve as criteria for grouping or separating items in the context of data clustering. Clustering with the machine learning 160 may help to identify that a plurality of events are related in some form (to identify service impact events). For example, data attributes may be extracted from discrete entries within system log files, data of the system log files being associated with network events such as device failures. The attributes extracted from the system log files may include a time stamp, a device identifier indicating which device generated the log file, an error type identifier, a telecommunications service identifier, and the like. The machine learning 160 may be used to generate a clustering model or set of rules that clusters certain network events, or attributes of such log files, within a close temporal range based on comparison of timestamp values for the various event records. Specifically, a first network event may be clustered with a second network event when timestamps for the two events occur simultaneously or within some threshold difference in time. The threshold may depend on the type of event and to what extent one event causes, directly or indirectly, the second event, and the time of such causation.

Machine learning 160 may involve supervised or semi-supervised methods such as classification. Classification can be used to predict classes, where service impact events may be assigned to certain classes of a classification model. Classification machine learning methods may involve a training phase where initial training data is presented to the computing device 140 to generate a classification function. The initial training data may comprise past network event data, patterns of events with known correlation to service impacting events, as well as other classifications. In particular, the initial training data may include patterns, or other forms of data that may be used to teach the machine learning method that network events, alone or in combination with patterns or other classifications, are indicative of a service impacting event or other event. As such, the function is a computer-generated representation generated in response to the initial training data that predicts whether a network event is associated with a service impact event.

The computing device 140 may then be subject to additional training data to test or refine the model over time as new data is collected. Training may thus involve presenting additional past network event data to the function to output a class and test whether the function identified the correct class for the data input. The class outputted from the function may then be compared with a known correct result (known correct class for the additional past network event data). A known correct result may be a result that is predetermined to be correct by an expert or other definitive source, or based on evidence or collective agreement. For example, the function may take as an input the additional training data, process the additional training data using the function, and assign a class "X". The class X may be predetermined as being associated with a service impact event. One objective of the training phase is to minimize discrepancies between known correct results and outputs by the computing device 140 during classification. In the case of a discrepancy, results from an output of the computing device 140 may be used to adjust certain parameters of the function in such a way that if a data pattern were presented to the computing device 140 another time, the computing device 140 would theoretically produce a different output (different class) consistent with the known correct results. As such, machine learning 160 functions lend greater accuracy to the model 154 because the computing device 154 may modify such functions over time to increase prediction accuracy. Training of the computing device 140, using such classification methods, may be said to be complete when subsequent test data is presented to the computing device 140, the computing device 140 generates an output on that test data, and a comparison between the output and known correct results yields a difference or value that is within a predetermined acceptable margin. The present disclosure is not limited to training or machine learning with a computing device using classifiers and clustering. Additional methods for machine learning 160 may include: data visualization, statistics and probability, linear algebra, and data modeling (k-nearest neighborhoods, Naive Bayes, linear regression, logistics regression, decision trees, neural networks, network analysis, and Map Reduce). The ANT application 112 may be used to conduct aspects of the above described machine learning with the computing device 140. Using machine learning 160 methods as described herein, or otherwise analyzing network event data computationally to reveal patterns, trends, and associations about network events provides predictive analysis for service impacting events.

Returning to FIG. 8, block 506 describes that new network event data, which may be processed in real-time or near real-time (within a few minutes of being received or stored in the database) may be accessed by the computing device 140, and the computing device 140 may apply the new data to the model 154 to identify an imminent or active service impact event. New network event data may include messages, system log files, alerts, tickets, or the like associated with new network events such as errors, outages, failures, and other such events that occur within or otherwise involve the network 102 similar to the past event network data. The new network event, in the form of new network event data, may be accessed after the model 154 (rule or function) is generated in block 504 such that the new network event data may comprise new event data that needs to be interpreted or analyzed in some form. It should be understood that the ANT system 100 may process a large number of new network events that needs to be classified or otherwise interpreted using the function or rules generated in block 504 in order to identify and address service impact events.

In one embodiment, the ANT system 100 utilizes the CEP 228 to apply the model 154 to new event data or live event data streams occurring in real time in the network 102 in order to identify service impact events. The CEP 228 may access and combine new event data from multiple sources (such as network element 120A and network element 120B). For example, the CEP 228 may receive event data and apply a rule to identify a sequence of events S that is known to be a sign that a service impact event has occurred or is actively occurring, and generate an output indicating the same.

One method employed by the CEP 228 is illustrated by the combination of steps 20, 15, 19, 16, and 22-26 of FIG. 2. Sequence 20 shows an event queue 232 may temporarily store and organize new network event data for the CEP 228 as new network event data is retrieved or accessed by way of a stream bus 209. In other words, the stream bus 209 may operate as a communication hub that provides access to live or new network event data to the CEP 228 as generated from network devices such as the network element 120A and network element 120B. It should be understood that the new network data may also be aggregated and stored within a database such as the ANT data 246 or the database 122 of FIG. 1A. Temporary storage of the new network data within the new event database 122 may involve normalizing the new event data before it is stored and made available for use. In addition, the system log server 121 of FIG. 1A may be implemented to aggregate new network event data from one or more of the network elements associated with the network 102. In other embodiments, the CEP 228 may access network event data directly from network event data-generating resources such as the network element 120C.

The CEP 228 accesses and reads the model 154 or any rules suitable for identifying service impacting events, which may be stored in a rules database 248. A rule may define that where a system alert A occurs in the network 102, the occurrence of the system alert A is indicative of a service impact event. A new network event, new event stream, or new event sequence, which may comprise one or more events generated in a particular order, or sequence may be processed by the CEP 228 to identify whether a new event sequence associated with a new event stream matches, triggers, or satisfies the rule from block 504 in some form, meaning a particular service impact event has occurred or is likely occurring. FIG. 2 shows the CEP 228 may further use an ANT data access component 236 for its input and output (I/O) operations, and that the ANT data access 236 may write a plurality of logs which may be stored in a database referred to as ANT logs 244 as the CEP 228 scans new network data and identifies service impact events.

The CEP 228 may further apply or feed the new network data to any rules or functions generated from the machine learning 160 to identify whether a new network event is indicative of a service impact event. To feed a new network event through a model 154 incorporating the machine learning 160, network data associated with the new network event may be broken down into attributes as described herein which may be used as input parameters for any of the rules or functions generated from the machine learning 160. Specifically, attributes of new network event data may define a set of quantifiable properties or features which may be used as input parameters for functions or rules associated with machine learning 160. For example, discrete entries within system log (network event data) may include attributes such as a timestamp or other information about when the system log occurred, a network device identifier associated with the system log, or the like. Such attributes may be fed into the rules or functions developed during machine learning 160. For example, attributes from a system log may be fed into a function generated from machine learning 160 for classifying a particular event. The function may output a particular class, which may be predetermined as defining a service impact event.

As described in block 508, a responsive action 156 may be identified to address the service impact event identified in block 506. The responsive action 156 may include a task, or set of tasks to address the service impact event of block 506. For example, the responsive action may include issuing a notification about the service impact event to one or more customer devices such as the customer computing system 124c. In some embodiments, the responsive action 156 may be to issue an alert that a new network event indicates an active service impacting event is taking place in the network 102. For example, when the system identifies a fiber cut, the system may generate an a notification about the fiber cut, and that notification transmitted or otherwise triggered at a customer device, service provider device, or the like. Moreover, in some instances, the result of the event may be triggered or provided. For example, with respect to the service provider, the actual occurrence of a fiber cut may be triggered, whereas the service disruption triggered by the fiber cut may be triggered at the customer device.

The responsive action 156 may further involve generating a recommendation for a technical resolution suggestion to resolve the service impact event. More specifically, the system may use the event generated by the rule as a key to access an event history database 242 or the past events database 152 that stores information about past events, including information about the resolution of past events.

As described in block 510, a resolution action may be initiated to resolve the service impact event. This may be triggered automatically by the ANT system 100. A responsive action may comprise, for example, reconfiguring (or instructing other systems to reconfigure) one or more service instances to address a service impact event as a network outage in a specific location. For example, to address a service outage in a first location, which may be identified by the output of block 506, the computing device 140 may be configured to automatically and proactively initiate resolution or corrective action and reconfigure network connections for customers in the first location (before the customers have to submit tickets or technical requests for assistance or complaints). Another example of a responsive action may involve initiating a rollback to a previous version of a driver for a router where a driver update installed to the router causes the router to malfunction. In this example, the router malfunction would be the service impact event, and the act of rolling back to a previous driver version for the router would be the resolution action to address the service impact event.

Figure 9:
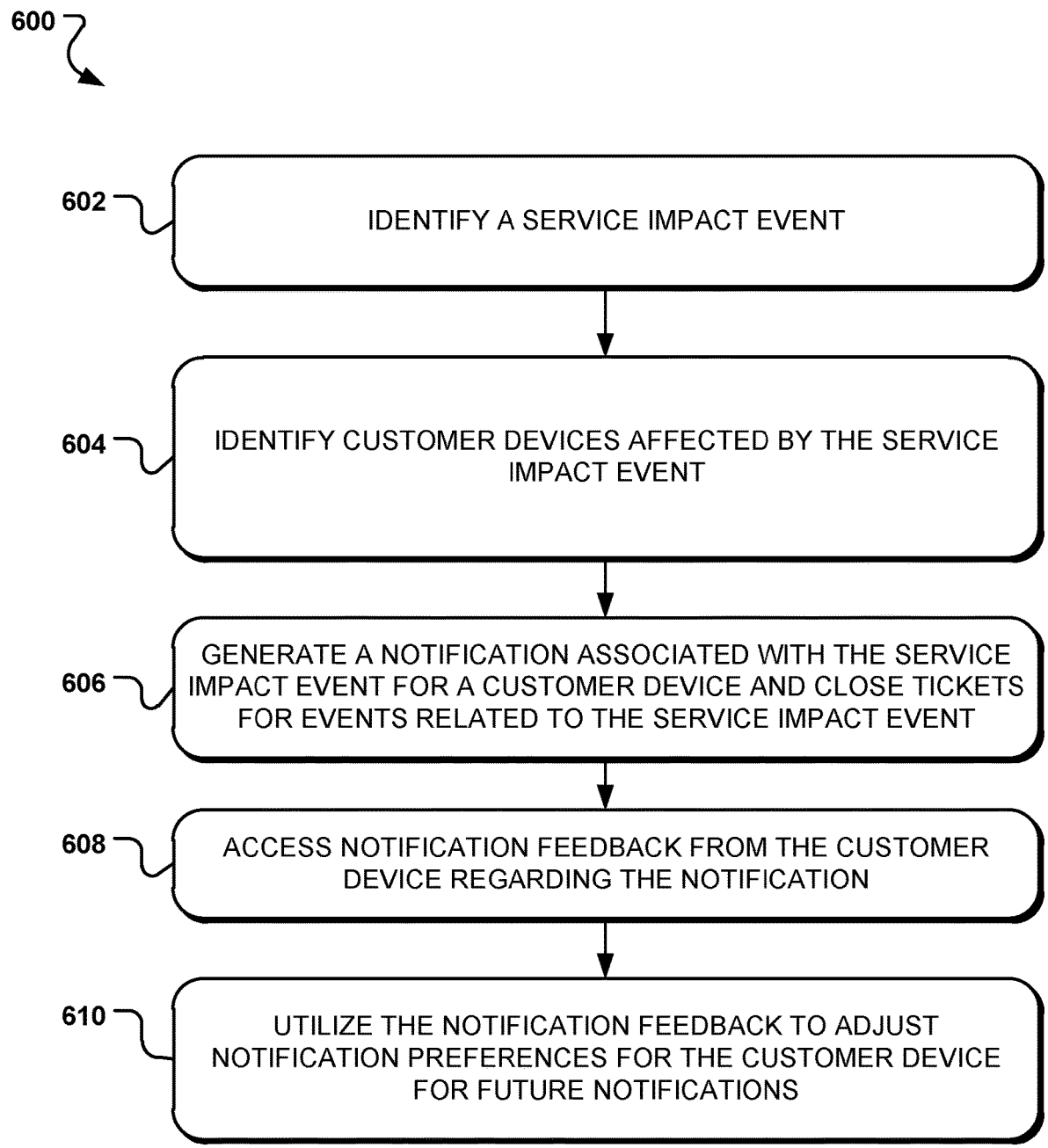
FIG. 9 illustrates an exemplary process flow for adapting notifications and ticketing with reference to the process flow of FIG. 8 and the ANT system of FIGS. 1A-1B and FIG. 2, according to aspects of the present disclosure.

FIG. 9 is a process flow 600 related to the process flow of FIG. 8 for describing adaptive notification and ticketing for service impact events (identified in FIG. 8), which may be described with reference to FIG. 1A, FIG. 2, and FIGS. 3-8. In block 602, a service impact event associated with the network 102 is identified using the steps detailed in FIG. 8. The service impact event may be, for example, a fiber cut that has occurred somewhere in the network 102. For example, a fiber cut may have occurred in New York, as illustrated by the service impact event 302 of the exemplary map interface 300 of FIG. 3. The map interface 300 comprises a feature of the dashboard 220, where network events may be displayed in different geographical locations so that a customer or network administrator can assess events from a map perspective. In addition, time duration settings of the map interface 300 may be adjusted so that network events displayed may be associated with a specific time, date, or temporal range. The map interface 300 may be generated by the dashboard 220.

In block 604, the ANT system 100 may identify specific customer services affected by a service impacting event. For example, attributes of an event sequence (when applied to a rule that identifies a fiber cut) may reference a particular router or portion of a router affected by the fiber cut. The router attribute may be used to query an inventory database 250 that stores information about the router. The ANT system 100 may also use the router information from the inventory database 250 to query a customer enrichment database 252 that maps inventory information from the inventory database 250 to customer utilization. The ANT system 100 may use the router information from the inventory database 250 to query an entitlements and service level agreement (SLA) database 254 that tracks customer service information. The aforementioned information may be used to determine what customer devices are accessing the router or what customer services or connections may be impacted by the router being offline due to the fiber cut. Referring back to the example in FIG. 3, the map interface 300 indicates that the service impact event 302 dealing with a fiber cut In New York affects or impacts devices and/or services in Austin, Tex. The ANT system 100 may identify that the fiber cut associated with the service impact event 302 that occurs in Net York affects customer devices or services in Austin, Tex. by accessing attributes of an event sequence that triggered the fiber cut associated with the service impact event 302. The attributes of the event sequence may include router information that may be used to query the inventory database 250 and identify that a particular router or portion of a router located in Austin, Tex. has been affected by the fiber cut in New York.

In block 606, a notification or alert may be generated for the fiber cut. Sequences 10, 9, 27, 17, 18, 11, 12, 5, and 6 of FIG. 2 are associated with the features of providing alerts or notifications to devices communicating with ANT system 100. A notification may be generated for a customer device such as the computing system 124c regarding the fiber cut. The alert engine 230 of FIG. 2 processes such service impact events and notifies applications users based on user preferences. The alert engine 230 may be utilized to send at least one alert to a notification API 240. The notification API 240 is an interface that may be used to translate information about alerts into a notification so that notifications may be sent to customers regarding alerts. The alert engine 230 may further be used to open a master ticket for the new service impacting event of the fiber cut. A master ticket may be a ticket that signifies a larger event, such as a service impact event that needs immediate attention. Sequence 10 of FIG. 2 shows that a service impacting event and status changes regarding the service impact event of the fiber cut may be sent from the CEP 228 to the alert engine 230. Sequence 11 shows the notification API 240 may be used to translate information about an alert to a notification. The notification may then be sent to a customer using an SMS service or SMS alerts component 222. In sequences 5 and 6, the SMS alerts component 222 transmits notifications to phones and tablets 214B so that customers can receive the notification regarding the fiber cut in the form of text messages. Sequence 12 shows the notification API 240 may further be used to translate an alert to an email notification which may be used by the sendmail service or email alerts component 224 so that customer devices may receive the notification in the form of an email. Exemplary notifications regarding service impact events are depicted in notifications 362A-362kb and 364 of FIG. 6, and 382a-382h and 384 of FIG. 7. Notifications 364 and 384 may be associated with new or more critical service impact events by being prominently displayed as shown. In some embodiments, notifications may be provided to customers via social media accounts (on a social media wall of a user).

As further shown in block 606, the ANT system 100 may close any child tickets associated with the fiber cut. Where it is determined that a smaller number of network events are actually indicating a larger service impacting event such as the fiber cut, tickets for the smaller network events (children tickets) may be closed out as needed when a master ticket associated with the service impacting event is opened. Ticket priority may also be assigned based on a class or type of service impacting event that occurs in the network 102.

In block 608, the computing system 140 of the ANT system 100 accesses notification feedback from a customer device regarding the notification of a service impact event, such as the notification regarding the fiber cut. Notification feedback from a customer may be received from a customer portable electronic device 214b or other customer computing device 214a using an input window, shown in FIG. 6 as input window 370 and shown in FIG. 7 as input window 390 as part of the dashboard 220, user interface 118, or other portal for displaying the notification. As further shown in FIGS. 6 and 7, the input windows 370 and 290 allow customer devices to provide notification feedback upon being presented with service impact events in the form of alerts 362A-362kb and 364 of FIG. 6, and 382a-382h and 384 of FIG. 7. Further, the customer devices may also call dashboard APIs, such as the notification API 240, from the integration tier 208 to e.g. adjust notification preferences.

In block 610, the ANT system 100 utilizes any notification feedback received to adjust notification preferences for customer devices. Specifically, in sequences 2 or 3, the dashboard 220 may receive feedback from a customer 215 through the customer device 214*a* or customer device 214*b* about relevance of alerts transmitted to the customer devices. The customer preference information and other ANT data may be read by the alert engine 230. The ANT system 100 may submit the feedback to the adaptive API 234. The adaptive API 234 may translate the feedback, or normalize the feedback to a form that may analyzed by the CEP 228, to learn from the feedback, determine updates need to be made to customer preferences regarding notifications, and may update customer preferences data as needed. In sequence 21, user preferences may be stored in a database such as the ANT data 246.

In some embodiments, customer feedback may be interpreted using the machine learning 160 to adapt network event notifications to customer preferences. The computing device 140 may be tested with a customer operating the customer computing system 124*c* to determine whether the adapted notification preferences stored in the ANT data 246 are acceptable to the customer. A customer of the network 102 may have the ability to view, subscribe to, and unsubscribe from receiving alerts and notifications which deal with events that impact the customer's network.

The functionality of the ANT system 100 may be extended to customer devices and network administrator devices as needed. The dashboard 220 of FIG. 2 may be used to access or view aspects of the ANT system 100. In sequence 2, a web application may be implemented by a customer device of the network 120 to view aspects of the dashboard 220 by using a customer device 214A (similar to the customer computing system 124*c*). More specifically, the dashboard 220 may be used to display information about network events to customer devices 214, employee devices, or other predetermined devices. In sequences 3 and 4 of FIG. 2, other customer devices such as phones or tablets 214B, may have access to the dashboard 220, and such access may be implemented using native applications so that the customers can securely access network event data behind a firewall. The phones and tablets 214B may utilize HTML 5 web applications to access data from the ANT system 100.

Returning to FIG. 1A, the network 102 may further be communicably coupled to one or more computing devices or computing systems 124. In the example of FIG. 1A, the computing systems 124 may include at least one of an administrator (admin) computing system 124*a*, an employee computing system 124*b*, and a customer computing system 124*c*. Each of the computing systems 124 may comprise a personal computer, a tablet, a smart phone or the like, that is capable of communicating with, accessing, or executing aspects of the ANT application 112 for functions including management, processing, and displaying of alerts and events. In some embodiments, the computing systems 124 may include native software applications so that the computing systems 124 may communicate with the ANT application 112 and access data.

As further shown in FIG. 1A, in some embodiments, each of the computing devices 124 communicates with or otherwise accesses aspects of the ANT application 112 via a dashboard or user interface (UI) 118. Specifically, to access the ANT application 112, the admin computing system 124*a* utilizes an admin UI 118*a*, the employee computing system 124*b* accesses an employee UI 118*b*, and the customer computing system 124*c* accesses a customer UI 118*c*. User interfaces 118*a*-118*c* offer different levels of functionality and accessibility of the ANT application 112 depending on the type of user operating the one or more computing systems 124. For example, in one embodiment, an admin UI 118*a* allows the admin computing system 124*a* to manage system events and alerts whereas the customer UI 118*c* limits the customer computing device 124*c* to receiving alerts about events of network 102 without management functionality. In some embodiments, the UIs 118 may comprise a web interface. More specifically, a user can log onto a web page via a browser of the computing system 124 and access the UI 118. The UIs 118 may further comprise at least one application program interface (API) to provide additional flexibility of access. In some embodiments, the UI 118 is accessible to a user of a computing system 124 via a mobile or general software application downloaded or accessible on the computing system. Each of the UIs 118 may be tuned to user preferences corresponding to the respective users of the UIs 118. Specifically, as explained herein, the computing device 140, in concert with the ANT application 112, may learn to identify patterns about what kinds of alerts or notifications certain users wish to receive and what kinds of alerts or notifications such users would rather not receive based on user feedback, or other raw network data and by utilizing machine learning and event processing as described herein. The UIs 118 may further include an explore feature that displays data geographically and temporally for enhanced analysis. For example, an admin user may utilize the admin UI 118*a* to view network events for a specific location and duration of time.

Figure 4:
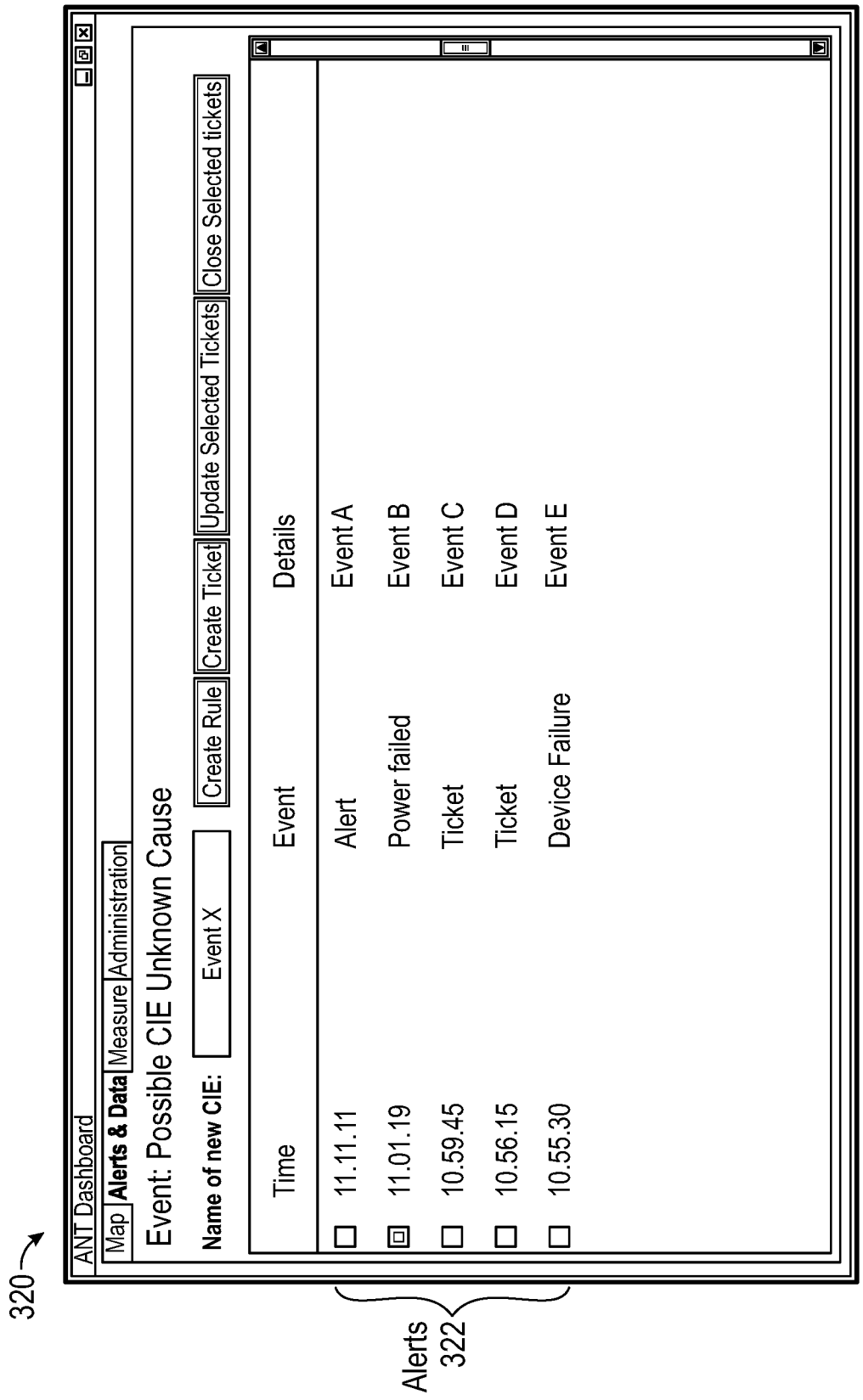
FIG. 4 is an exemplary dashboard of an ANT application showing an alerts and data tab, according to aspects of the present disclosure.
Figure 5:
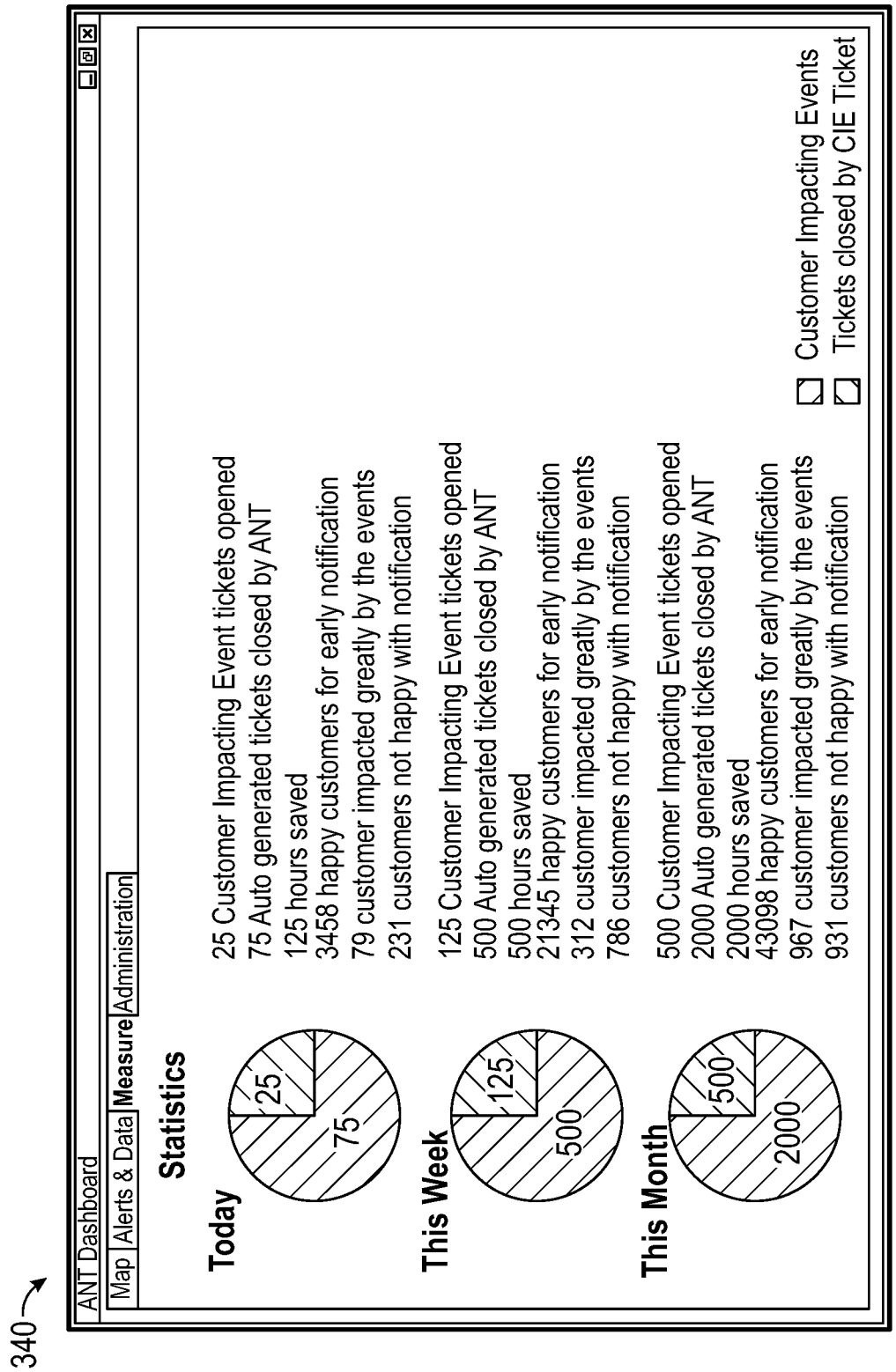
FIG. 5 is an exemplary dashboard of an ANT application showing a measure tab, according to aspects of the present disclosure.

Additional description will now be provided regarding the exemplary interfaces of FIGS. 4-7. FIG. 4 illustrates an exemplary alerts and data tab 320. As shown, a user may be provided with a list of network events (and possible service impacting events), listed according to date and time with a description or details about each event. FIG. 5 illustrates an exemplary measure tab 340. As shown, the measure tab may include statistics regarding network events that have transpired within the network 102. The measure tab may display graphical information about customer/service impacting events that have been generated or opened, how many of the events have been closed by the ANT application 112, reporting about early notifications to customers (where the ANT application 112 and the trained computing device 140 have proactively discovered service impacting events before being reported), and the like.

Figure 6:
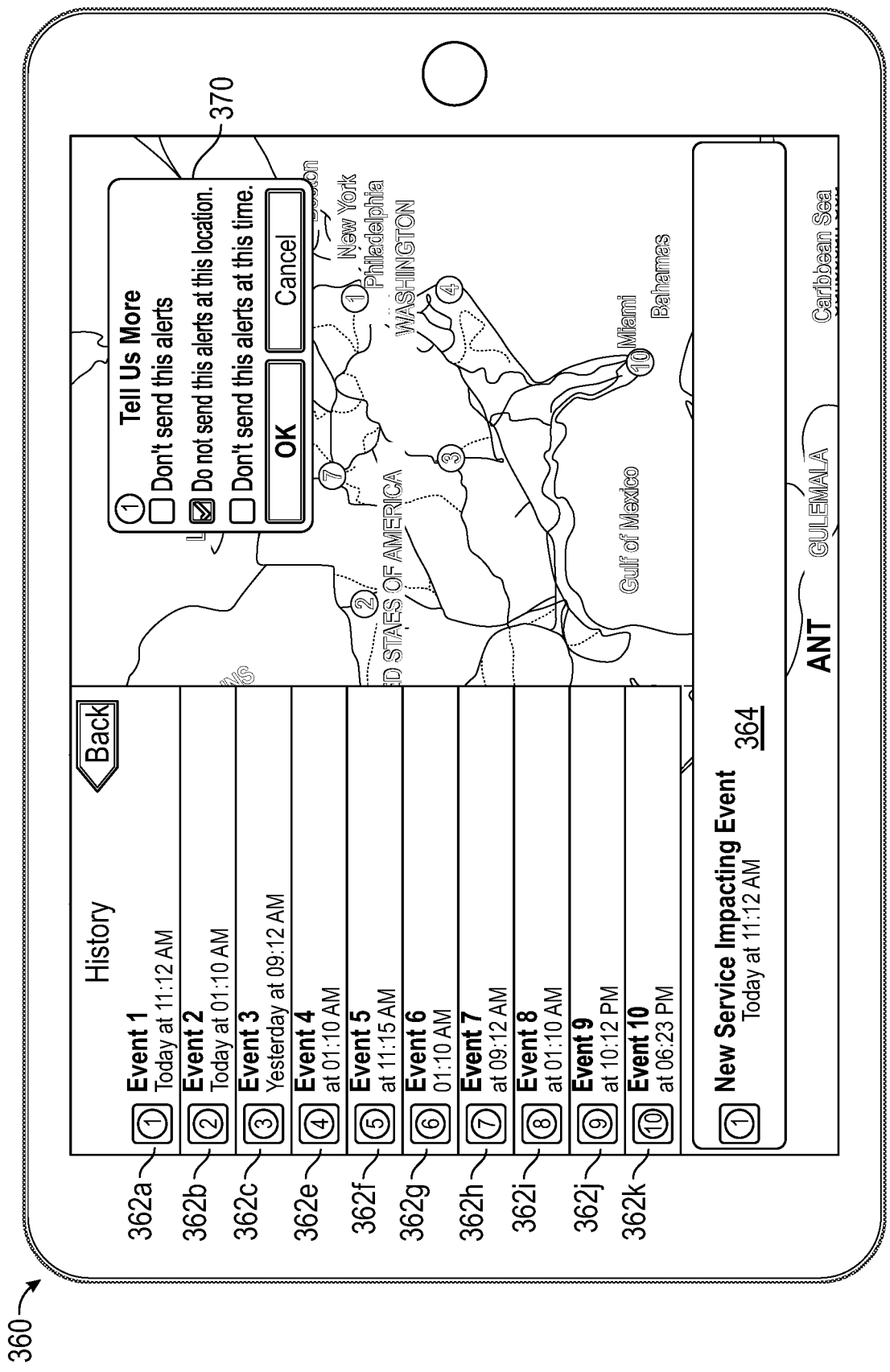
FIG. 6 is an exemplary user interface for a mobile device showing a map feature, according to aspects of the present disclosure.
Figure 7:
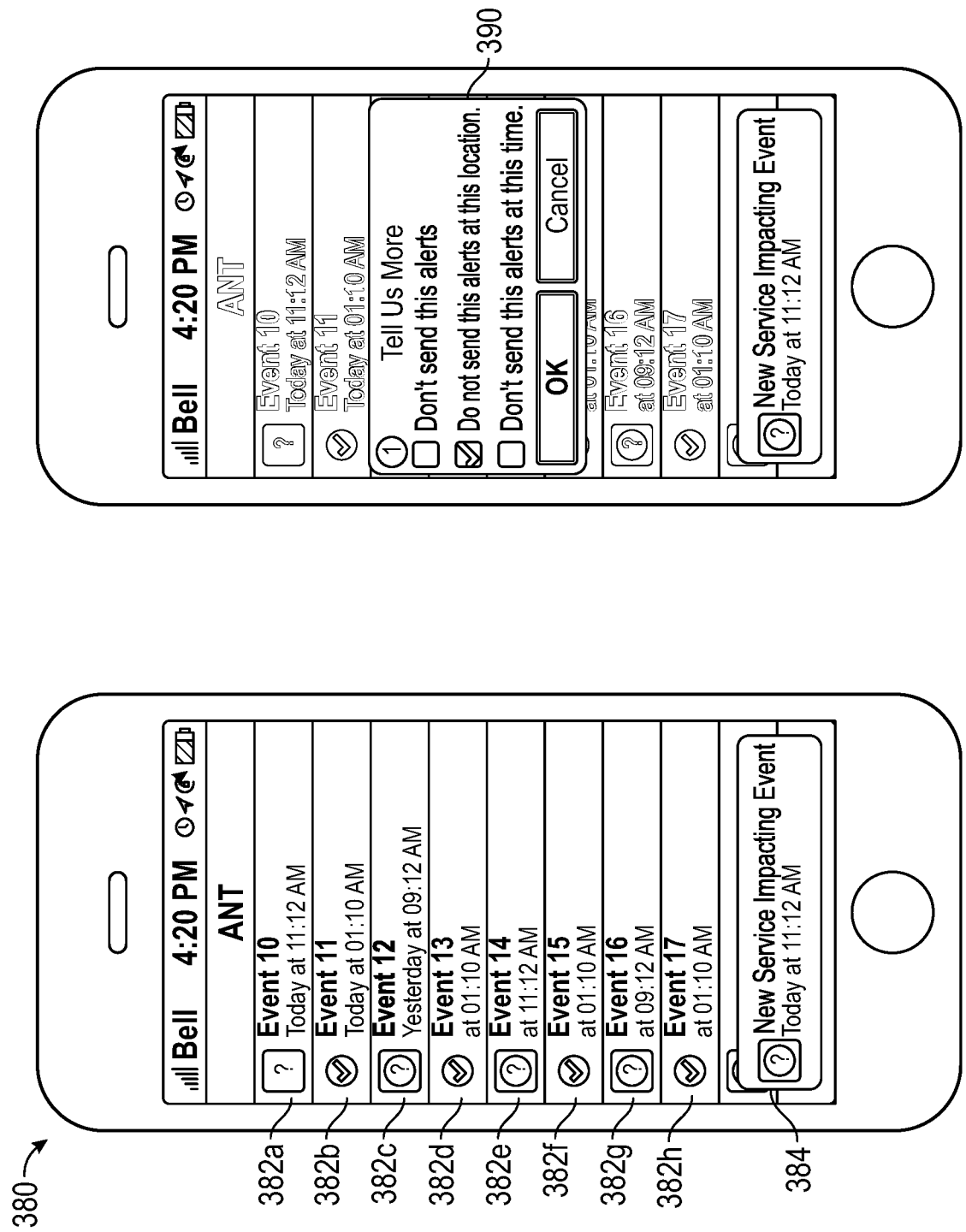
FIG. 7 is an exemplary user interface for a mobile device showing alert notifications, according to aspects of the present disclosure.

FIG. 6 illustrates an exemplary dashboard 360 that may be accessible by a customer of the service provider managing the network 102, embodied within or as part of the customer UI 118*c*. As shown, a list of alerts regarding service impact events (362A-362K) may be displayed in a history box, and alerts regarding certain service impacting events, such as the service impacting event alert 364 may be displayed more visibly as a part of a ribbon or pop-up at the bottom of the example interface. In addition, a map outlining network events may be displayed in a side window pane. The example shows that multiple reporting details may be displayed all at once. FIG. 7 illustrates an exemplary implementation of an interface 380 for a mobile phone. Similar to FIG. 6, a list of alerts associated with network events (382A-382H) may be displayed with an alert regarding a new service impacting event 384 visibly displayed to the user to quickly bring such an event to the user's attention.

Returning to FIG. 2, the ANT system 100 may comprise a number of components described herein and associated with a client tier 202, a presentation tier 204, a business tier 206, an integration tier 208, and a resource tier 210. The components of FIG. 2 may be associated with the following definitions in Table 1.

TABLE 1

| Name | Description |
| --- | --- |
| Personal Computer | ANT system may support the personal computer for the dashboard, email, short message service (SMS) alerts and administration clients. |
| Smart Phones | ANT system may support smart phones for the dashboard, email, and SMS alerts. |
| Tablets | ANT system may support the tables for the dashboard, email, and SMS alerts. |
| Rule Admin UI | The subject tool may aid an administrator in analyzing a service impacting event. It may further aid in defining and testing the rule in the history data. |
| Dashboard | The dashboard may collect alerts from the Alert Engine. It may apply the rules from an adaptive API and the user role to display service impacting events and display them on the user's dashboard. It may take the user's feedback and send it to the Adaptive API. |
| SMS Alerts | The component may push the alerts to the mobile devices. |
| Email Alerts | The component may send email alerts via email. |
| Rule Validation | This module may validate rule syntax and tests rules against existing data to verify it meets predetermined requirements. |
| Complex Event Processor | The Complex Event Processor (CEP) scans an event stream to match/find an event sequence that matches a rule. It may identify the service impacting events. |
| Alert Engine | The Alert Engine processes the service impacting events and notifies application users based on user preference either learned or provided by the customer. The alerts may be placed on the dashboard, sent via SMS and email, or ignored. |
| Stream Bus | The component is the source of events, conditions, and logs of any type which has information to determine a service impacting event. In some embodiments, the stream bus may utilize Splunk, and other sources. |
| Event Queue | The component may be filter down data that is scanned by the Complex Event Processor (CEP). It may be a component of the CEP. |
| Adaptive API | The component takes feedback for customers and other data to programmatically build rules used by the CEP and Alert Engine. |
| ANT Data | The ANT Data is a set of APIs to access data for ANT. |
| Ticket API | A Ticketing API. |
| Notification API | A module for notifying customers about network events, which may include notifications through email and SMS alerts. |
| Event History | This may include history of events including data which can be used to build and test rules. |
| Ant Logs | The component comprises a log of service impacting events. The status history and actions taken on the events. |
| ANT Data | One possible database for ANT systems. It may store the status change and other metadata for the service impacting events. |
| Rules Inventory | This component comprises rules built to correlate the data and customer notification preferences/network and equipment inventory data. |
| Customer Enrichment Data | This component includes data to map the inventory to customer utilization. |
| Entitlements and SLA | This component includes customer entitlement and service level agreement (SLA) information. |

It should be understood that the ANT system 100 according to aspects of the present disclosure is not limited to the components and sequences of FIG. 2. It should be further understood that the sequences depicted from 1-27 are merely for demonstrative and explanatory purposes such that FIG. 2 is not intended to limit the sequences discussed to any particular order or content. Consequently, in some embodiments, the sequences discussed may vary in order and content and additional components and interactions between components of the ANT system 100 are contemplated. It should be further understood that the embodiments of FIG. 1A and FIG. 2 are not mutually exclusive such that the present disclosure contemplates one or more features of FIG. 1A may be integrated with FIG. 2 and one or more features of FIG. 2 may be integrated with FIG. 1A.

Figure 10:
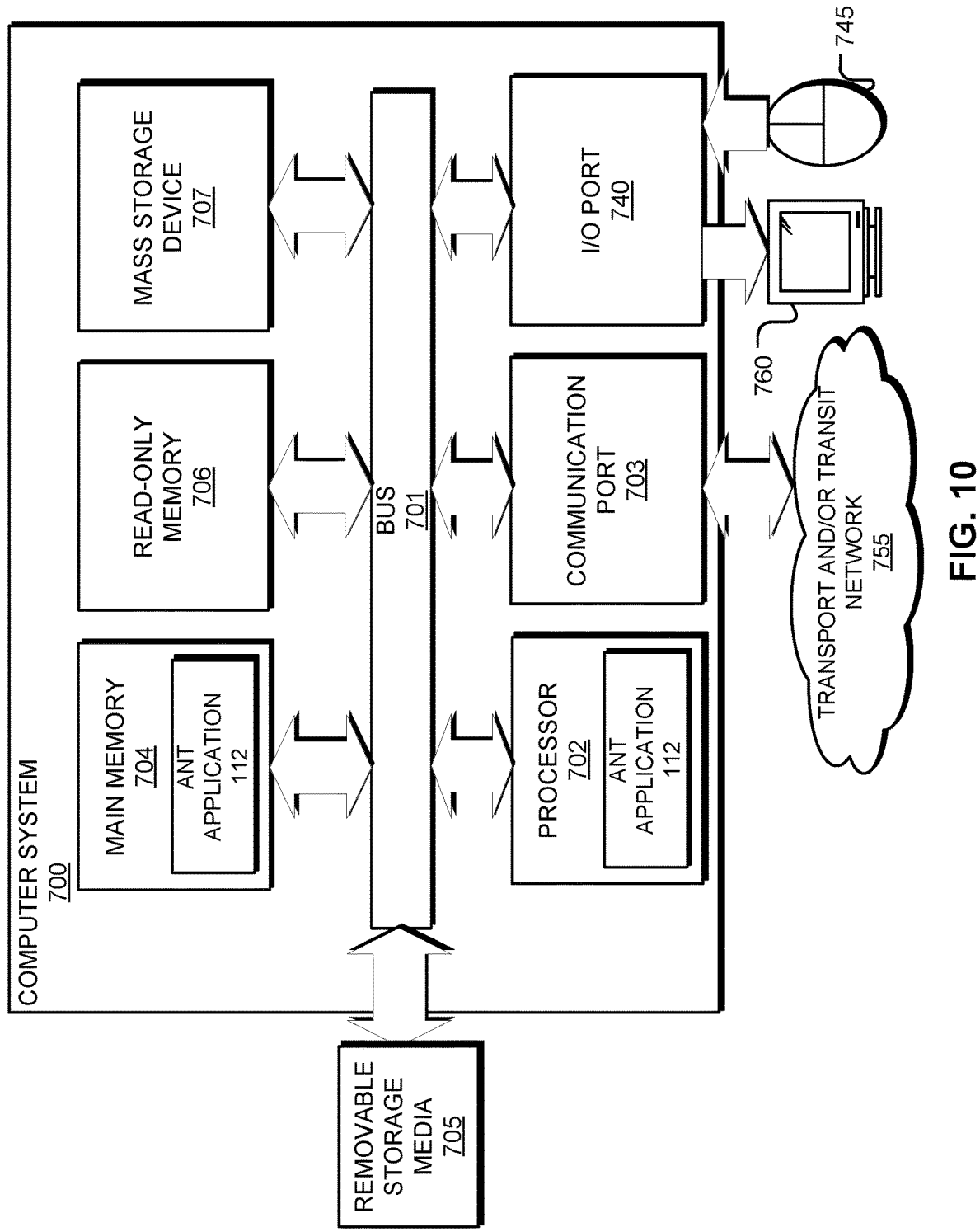
FIG. 10 illustrates an example of a computing system that may implement various services, systems, and methods discussed herein.

FIG. 10 is an example schematic diagram of a computing system 700 that may implement various methodologies discussed herein. For example, the computing system 700 may comprise the computing device 140 used to execute the ANT application 112, or, it may comprise a computing system 124 used by end users to communicate with the ANT application 112 and receive alerts and information related to alerts. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing system 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with an ANT application 112 that supports functionality as discussed above. The ANT application 112 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the ANT application 112 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, implemented by a computing device, for adaptive notification and ticketing, comprising:
   accessing data associated with a plurality of past events from a plurality of network elements of a telecommunications network;
   generating a model from the data, the model configured to receive a plurality of new events and generate an output indicative of an active service impact event based on an occurrence of a specific sequence of events from the plurality of past events;
   applying the plurality of new events to the model;
   based on the plurality of new events including the specific sequence of events, generating the output indicative of the active service impact event;
   querying an inventory database based on one or more attributes of the plurality of new events, the inventory database storing information related to customer utilization of at least one network element of the plurality of network elements;
   identifying one or more services affected by the active service impact event based on querying the inventory database;
   from the output indicative of the service impact event, generating a responsive action; and
   resolving the active service impact event affecting the identified one or more services using at least one predetermined method derived from the plurality of past events.

2. The method of claim 1, further comprising:
   wherein the service impact event is a network event that disrupts a network service associated with the telecommunications network; and wherein the responsive action comprises generating a notification to at least one device, the notification indicative of the service impact event.

3. The method of claim 2, wherein the responsive action comprises transmitting information about the new event and the active service impact event to a device that triggered a service disruption.

4. The method of claim 1, wherein the responsive action comprises adjusting preferences with respect to notifications of network events for a device associated with a customer of the telecommunications network.

5. The method of claim 1, further comprising:
wherein the plurality of past events include system errors or outages;
wherein the network element comprises a network service computing device, switch, or router; and
wherein the model comprises a function or rule associated with the plurality of past events.

6. The method of claim 1, further comprising generating the model by using complex event processing to correlate a subset of the plurality of past events that share similar attributes and occurred over a common predetermined period of time.

7. The method of claim 1, further comprising:
generating the model using machine learning, by:
identifying known patterns about the plurality of past events;
presenting the plurality of past events and the known patterns to the computing device as a training data set; and
utilizing the computing device to generate the model based on the training data set.

8. The method of claim 7, further comprising applying the model to the new event to identify a class associated with the new event, the class defining a service impact event.

9. The method of claim 1, further comprising:
wherein the plurality of past events includes information about a user preference for displaying notifications about the plurality of past events from the data for a customer; and
generating a customer preference rule for the customer that defines an adapted notification protocol unique to the customer.

10. The method of claim 1, further comprising:
collecting feedback from a user device about notifications associated with the plurality of past events;
submitting the feedback to an adaptive application programming interface (API) accessible by the computing device;
translating the feedback to notification updates using the adaptive API; and
applying the notification updates to the notifications for the user device.

11. The method of claim 1, further comprising:
verifying syntax of the model and testing the model against past network data; and
storing the model in a database for use by the processor.

12. The method of claim 1, further comprising:
displaying a first notification that the event indicates an active or imminent service impact event by a user interface; and
displaying a second notification regarding a status change associated with the active or imminent service impact event.

13. An adaptive notification and ticketing apparatus, comprising:

a network element of a telecommunications network that generates past network event data, the past network event data associated with a past network event; and
a computing device with access to the past network event data, the computing device:
generating a rule from the past network event data based on an occurrence of a specific sequence of events present in the past network event data;
applying a new network event to the rule;
based on the new network event satisfying the rule, identifying an active service impact event;
querying an inventory database based on one or more attributes of the new network event, the inventory database storing information related to customer utilization of the network element;
identifying one or more services affected by the active service impact event based on querying the inventory database;
generating at least one recommendation for resolving the active service impact event affecting the identified one or more services using at least one predetermined method derived from the plurality of past events; and
triggering the at least one predetermined method.

14. The apparatus of claim 13, wherein the active service impact event disrupts a telecommunications service for one or more customer devices.

15. The apparatus of claim 13, wherein the computing device comprises a complex event processor for scanning live network data to identify the event sequence.

16. A method for adaptive notification and ticketing, comprising:
utilizing machine learning to train a computing device, by:
providing a training data set to the computing device comprising a series of network events, at least a portion of the training data set comprising a specific sequence of network events associated with known classes defining one or more service impacting events;
generating a model based on results of the providing of the training data set to the computing device to predict future service impacting events;
verifying syntax of the model and testing the model against past network data;
storing the model in a database for use by a processor;
applying the model to a new network event to identify a class associated with the new network event, wherein the computing device comprises a complex event processor for scanning live network data to identify a specific sequence of events associated with the class; and
querying an inventory database based on one or more attributes of the new network event, the inventory database storing information related to customer utilization of at least one network element of the plurality of network elements;
identifying one or more services affected by the new event based on querying the inventory database.

17. The method of claim 16, further comprising weighing certain parameters of the model for certain network events that are predetermined to be especially indicative of known examples of service impacting events.

18. The method of claim 17, further comprising:
extracting a value from the new network event; and
applying the value as a parameter to the model to identify the class, wherein the class indicates whether the new network event is associated with a service impact event.

19. The method of claim 18, further comprising generating a probability value that the new network event is indicative of an active or imminent service impacting event.

20. The method of claim 17, further comprising generating a responsive action based on the new event, wherein the responsive action includes where the at least one service is triggered at the device located at the location other than the location of the new event.

* * * * *